United States Patent [19]

Howard et al.

[11] 3,868,221

[45] Feb. 25, 1975

[54] METHOD AND APPARATUS FOR DEGRADATION TESTING OF STABILIZED POLYMERS

[75] Inventors: John Benedict Howard, Summit; Robert Franklin Westover, Princeton, both of N.J.

[73] Assignee: Bell Telephone Laboratories, Incorporated, Berkeley Heights, N.J.

[22] Filed: Aug. 31, 1973

[21] Appl. No.: 393,597

[52] U.S. Cl.......... 23/230 R, 23/230 PC, 23/253 R, 23/253 PC, 73/15 B, 73/341, 73/361
[51] Int. Cl...................... G01n 25/00, G01n 33/44
[58] Field of Search........ 23/230 R, 253 R, 230 PC, 23/253 PC; 73/341, 361, 15 B

[56] References Cited
UNITED STATES PATENTS

| | | | |
|---|---|---|---|
| 2,813,425 | 11/1957 | Woolley | 73/341 |
| 2,947,163 | 8/1960 | Stone | 73/15 B |
| 3,205,158 | 9/1965 | Renier | 73/356 X |
| 3,360,993 | 1/1968 | MacMillan | 73/361 |
| 3,582,282 | 6/1971 | Kampf | 23/230 R |

OTHER PUBLICATIONS

Chemical Abstracts, 53: 20939f (1959).
Chemical Abstracts, 55: 11911a (1961).
Chemical Abstracts, 65: 7299h (1966).

*Primary Examiner*—Morris O. Wolk
*Assistant Examiner*—Sidney Marantz
*Attorney, Agent, or Firm*—A. N. Friedman; G. S. Indig

[57] ABSTRACT

Stabilized polymers are tested for resistance to exothermal degradation (e.g., oxidative degradation) at elevated temperatures. An apparatus is used in which several samples are simultaneously inserted into an oven which is maintained at the desired elevated temperature and maintained in the desired atmosphere. For each sample, measurement is made of the period between time of increase of the temperature of that sample, relative to the oven temperature, by a predetermined small temperature interval. It is considered that this temperature rise indicates the onset of accelerated exothermal degradation of that sample and that the time period is a measure of the effectiveness of the stabilizers in the polymer.

11 Claims, 4 Drawing Figures

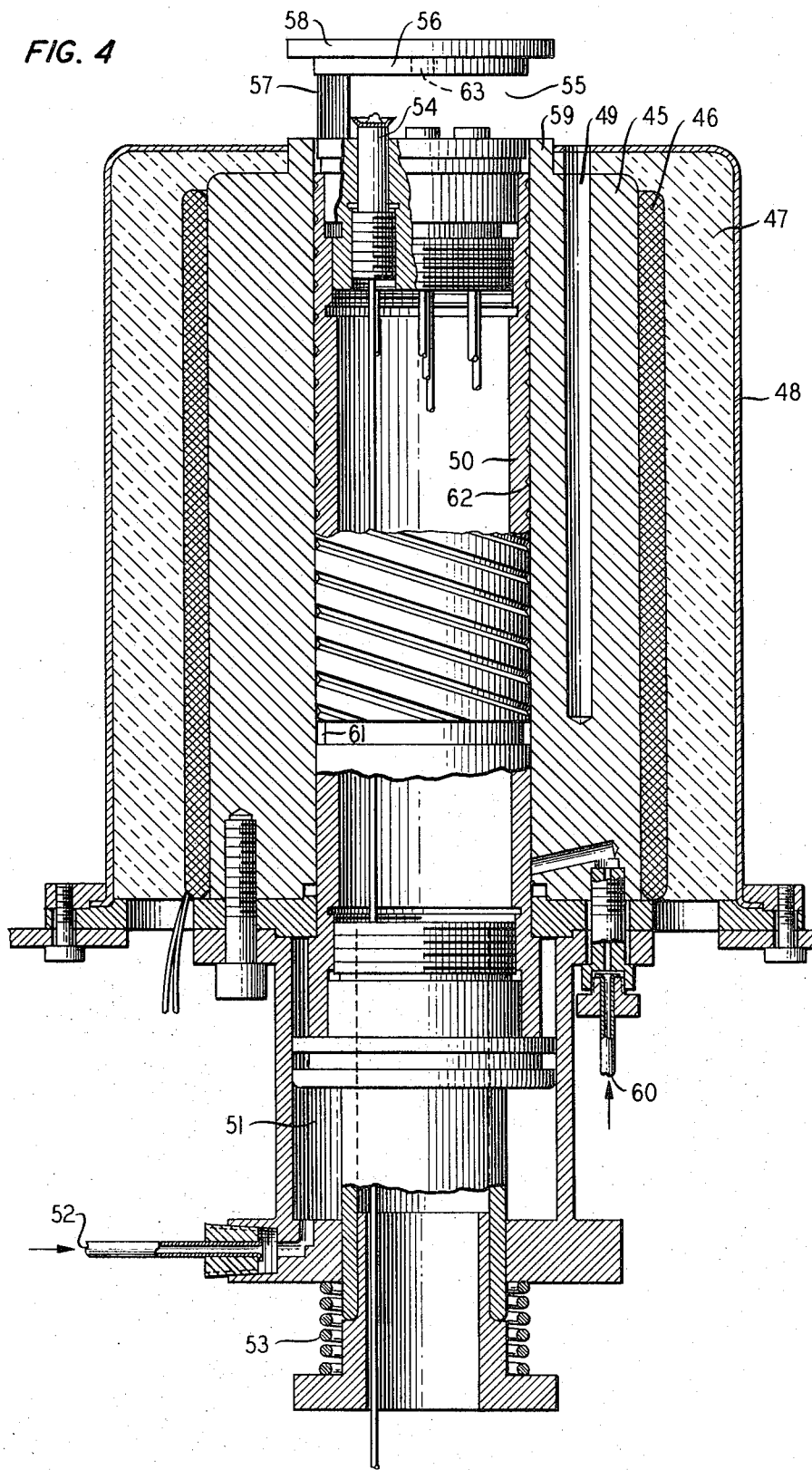

3,868,221

METHOD AND APPARATUS FOR DEGRADATION TESTING OF STABILIZED POLYMERS

BACKGROUND OF THE INVENTION

1. Field of the Invention

The invention lies in the field of the testing of polymers.

2. Brief Description of the Prior Art

Various additives are incorporated in polymers to increase the service life of articles fabricated from these materials. It is considered that these additives serve, in some way, to stabilize the mechanical properties of the polymer host material against attack by such environmental constituents as oxygen and ultraviolet radiation. A number of techniques have been developed to measure the effectiveness of these additives and to gauge the period of protection of these additives in the environment to which the finished article will be exposed. At testing laboratories interested in this problem, it is common to see racks containing polymer samples exposed to the elements in direct aging experiments. The physical properties of these samples are periodically observed in order to obtain the desired stability information.

Since the desired service life for many polymer articles is of the order of many years, this kind of testing is a slow process. In the interest of more rapidly gaining this kind of information a number of accelerated aging procedures have been developed. The results of these procedures have been correlated with the results of the direct aging experiments. One such testing procedure which has become quite common involves the measurement of the volume of oxygen absorbed by a sample of the subject polymer while the polymer sample held at a fixed elevated temperature (Biggs and Hawkins, Modern Plastics, 31 (1953) 121). These measurements have become known in the art as "Oxygen Uptake" measurements. For typical stabilized plastics it has been observed that oxygen is absorbed at a slow rate during the period of protection of the additives. At the end of the protected period the oxygen absorption accelerates to a much more rapid rate. When these data are plotted on a graph of Volume of Oxygen Absorbed vs. Time and the rapid oxygen absorptions of the portion of the curve is extrapolated back to the base line, the "Induction Period" of that polymer sample is derived. This quantity, Induction Period, has become a standard measure of polymer stabilization effectiveness.

Other investigators (e.g., Baum, *Journal of Applied Polymer Science*, 2 (1959) 281) have found that this oxygen absorption is an exothermal process giving rise to an increase in the temperature of the sample. These workers have measured the temperature of the stabilized polymer sample as a function of time. They have found, for typical stabilized polymer samples, a period of slowly rising temperature followed by a period of more rapidly rising temperature. These data have been used to derive an "Induction Time" which has been found to correlate with the results of oxygen uptake experiments.

Making use of this phenomenon Rudin et al. (*Industrial Engineering Chemistry*, 53 (1961) 137) have applied the techniques of differential thermal analysis to the investigation of the properties of stabilized polymers. In their experiments each sample is introduced singly into the measuring apparatus and temperature of the apparatus is slowly raised to the desired measurement temperature with the sample in a nitrogen atmosphere. Oxygen is then introduced into the space surrounding the sample and the temperature difference between the sample and a dummy sample is recorded on a chart recorder. Rudin's results show, typically, a period of slow temperature rise followed by a period of more rapid temperature rise. By extrapolating these results to the base line. Rudin derives an "Induction Time" which he correlates with the results of previous testing procedures.

The results of the above mentioned testing procedures have provided a great deal of scientific data which has been used in the investigation of the properties of polymers and in the development of new and improved stabilizers and stabilizer systems. However, it has become apparent that there is a need for a rapid method to monitor the stability properties of polymers in a production environment. It is desirable to measure the properties of a great many samples, including raw materials and fabricated product, in such industries as the plastic insulated wire industry, in order to provide improved quality control.

SUMMARY OF THE INVENTION

An apparatus has been developed which permits the rapid screening of the stability properties of many polymer samples at elevated temperatures. It has been found that, in an apparatus of appropriate thermal design, conditions can be selected such that the temperature difference between the sample and a reference thermometer will be less than a preset value during an initial period of time, correlatable with the period of protection of the stabilizers, and greater than this preset value during the period of accelerated temperature rise. This initial time period or "screening time" has been correlated with the induction time derived from prior measurement techniques and has been found to serve as an adequate quality control monitor for many polymer systems of commercial interest. This testing technique is applicable to polymers (e.g., polyolefins) which degrade by an exothermal process. In a test apparatus of the type contemplated here, several samples are simultaneously inserted, each contacting its own thermometer element. The portion of the apparatus withdrawn for sample insertion has a small heat capacity relative to the heat capacity of the main body of the oven. During the test cycle the temperature of the main body of the oven is held essentially constant while the sample insertion portion is withdrawn, loaded and reinserted. After insertion, the samples rapidly reach measurement temperature and the measurement of screening time can start immediately. Data retrieval from this apparatus is facilitated by the provision of an elapsed time indicator corresponding to each sample. These elapsed time indicators are automatically started upon sample insertion and each is stopped as the corresponding sample meets the preset temperature difference condition.

BRIEF DESCRIPTION OF THE DRAWINGS

FIG. 4 is an elevational view in section of an exemplary oven structure.

DETAILED DESCRIPTION OF THE INVENTION

Degradation Testing of Polymers

It has been observed that articles made of polymer material tend to lose their desired mechanical properties after long term exposure to various environmental conditions. For example, polyethylene insulation on copper wires has been observed to crack after long term exposure to an oxidizing atmosphere. It has been determined that, at least a portion of this degradation of mechanical properties, is due to oxidation of the polymer. In order to inhibit this oxygen attack and any other attack mechanisms which may be present, various additives have been developed for incorporation in the polymer body. These antioxidants and other protective additives serve to stabilize the mechanical properties of the polymer and protect the polymer against the various attacking agents. Typically, the period of such protection is finite. This protective period depends on such factors as the kind and quantity of the additives incorporated in the polymer body and on the temperature and composition of the environment to which the polymer body is exposed. Knowledge of the length of this protective period is required by the designer of the finished article in order to select a material suitable for the proposed use.

Figure 1:
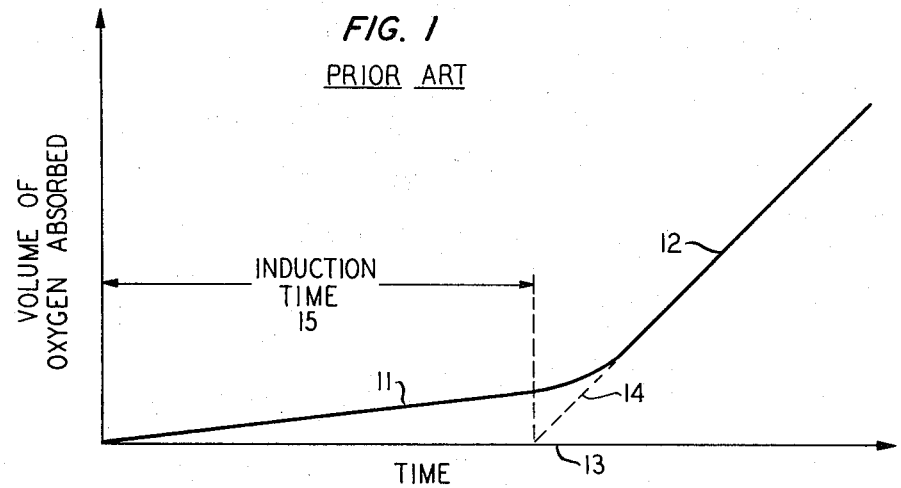
FIG. 1 is a curve showing the results of an "oxygen uptake" measurement (Prior Art) of the volume of oxygen absorbed by a sample of a typical stabilized polymer (ordinate) as a function of time (abscissa).

A widely used tested procedure for gathering information concerning the relative periods of protection of various polymer formulations is the measurement of the volume of oxygen absorbed by a sample of the polymer held at some elevated temperature. FIG 1 shows the typical characteristic of this kind of prior art measurement. FIG. 1 shows that the volume of oxygen absorbed as a function of time can be separated into two main portions 11, 12. During the initial portion 11, which has been found to correspond to the protected period of the polymer, oxygen is absorbed at a relatively slow rate. During the final portion of the measurement 12, corresponding to the period of degradation of the polymer, oxygen is absorbed at a much more rapid rate. The quantity which has been used to characterize these measurements is derived by extrapolating the second portion of the curve 12 back to the base line 13 (as shown by the dashed line 14). The time period thus derived 15 is known as the "Induction Time." This quantity, induction time, has been widely used in the gathering of scientific data concerning the degratation of polymers and the effect of protective additives. Similar data has been obtained by thermal analysis making use of the exothermal behavior observed during oxygen absorption.

Figure 2:
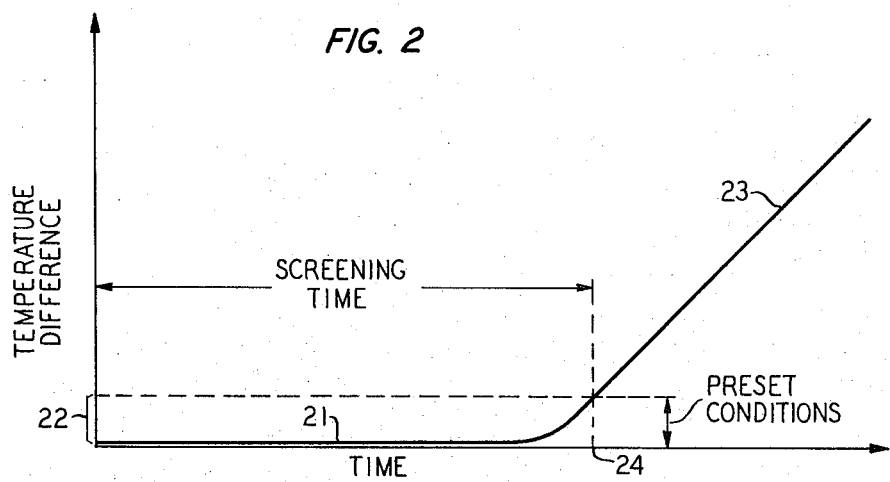
FIG.2 is a curve showing the results of a "screening" test performed on a sample of a typical stabilized polymer expressed as the temperature difference (ordinate) between a thermometer in contact with the sample and a reference thermometer, as a function of time (abscissa).

The apparatus developed for the screening of the effectiveness of protective additives in a large number of samples depends on the ability to provide a simple pass-fail test and to simultaneously test several samples. This test differentiates the slow exothermal reaction, observed during the protected period of polymer life, from the more rapid exothermal reaction which takes place during the period of degradation. FIG. 2 illustrates the typical characteristics of the thermal behavior of a typical stabilized polymer in such an apparatus. The apparatus is designed such that there is sufficient thermal contact between the sample and the oven such that during the initial period of testing 21 the temperature difference between the sample and the main body of the oven is held to within a fixed small temperature interval 22, which is the test condition. This thermal contact can be provided, for example, by the forced circulation of gas, at oven temperature, past the sample or by the provision of sufficient thermal contact through the sample support. During the period of accelerated exothermal reaction, the thermal contact between the sample and the oven is no longer sufficient to keep the sample near oven temperature and the temperature difference 23 rises to exceed the test condition 22. Here, we will call the time to which the test condition is satisfied the screening time 24, while such screening time data may not contain as much scientific information as the prior art measurements of induction time, it serves as an adequate comparison between many samples of similar materials such as might be met in the testing of raw materials and manufacture produce in a manufacturing situation. It can be used to differentiate between those samples meeting a given screening time specification and those which are substandard. In one mode of operation, the testing of each set of samples is terminated at the end of a fixed time period, which is the minimum allowable screening time for samples of the required quality.

The minimum allowable screening time can be established by measuring the screening time of a standard sample. If this screening time is less than five times the sample warm-up time, it will usually be desirable to reestablish this quantity at a lower oven temperature. For most degradation mechanisms, this will result in a longer measured time interval. The use of a minimum allowable screening time which is greater than five times the sample warm-up time will result in greater sensitivity and reliability of sample screening.

THE APPARATUS

Figure 3:
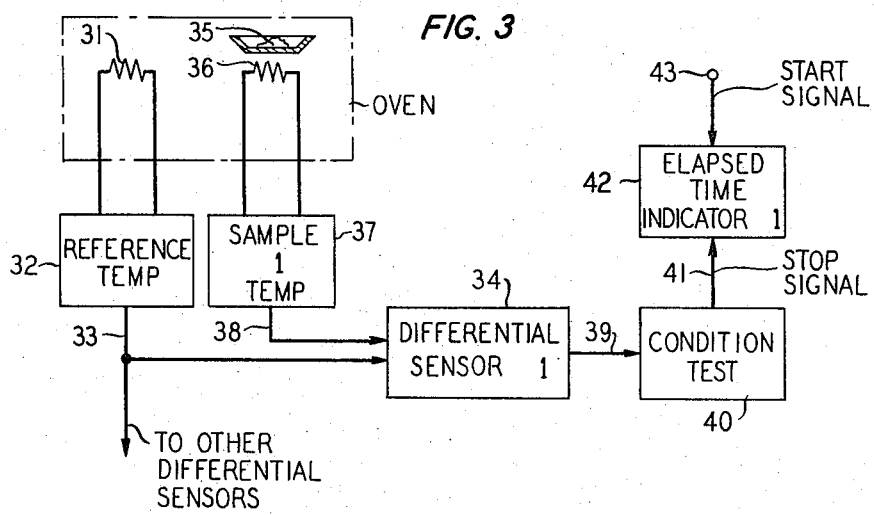
FIG. 3 is a schematic representation of an exemplary measurement circuit.

FIG. 3 illustrates one way in which the screening type testing mentioned above can be accomplished. A reference thermometer 31 is provided to measure the oven temperature. The temperature of this thermometer 31 is sensed by a device 32, appropriate to the thermometer type. The output 33 of this device 32 provides the reference signal going into one 34 of a set of differential sensors. Each 35 of the several polymer samples simultaneously tested by the apparatus, is in contact with a sample thermometer 36. Each sample thermometer is connected to an appropriate sensing device 37. The ouput 38 of this device 37 provides the other input to the corresponding differential sensor 34. A signal 39 corresponding to the temperature difference between thermometers 31 and 36 is tested 40 against the preset condition. When the test condition is satisfied a signal 41 is generated to stop the corresponding elapsed time indicator 42. All elapsed time indicators are simultaneously started 43 at the beginning of the test cycle. The simultaneous testing of at least 4 such samples is desirable for reasons of economy.

The thermometer elements used 31, 36 can be of any desired type. For apparatus presently contemplated, the use of compact elements of small heat capacity, such as suitably designed resistance thermometers or thermocouples, appears most convenient. Platinum resistance thermometers have been used in exemplary developed apparatus.

FIG. 4 shows an exemplary oven structure which has been developed and constructed for the screening of stabilized polymers. This structure will test six samples during each test cycle. A massive metallic cylindrical oven block 45 is surrounded by a heating element 46, thermal insulation 47 and an outer protective shell 48. It is provided with a well 49 to receive a thermometer element used for oven temperature control. The center of the cylindrical block 45 is bored to receive a closely fitting piston 50. At the bottom of the piston is a fluid chamber 51 into which, fluid is introduced and vented through orifice 52 in order to raise and lower the piston 50. A spring 53 is provided to assist in the lowering of the piston. The thermometer elements 54 protrude through the top of the piston 50 into the sampled space 55. During the test cycle the piston 50 is raised in order to withdraw the sample space 55 from the oven block 45 for the purpose of removing the already tested samples and inserting new samples.

After new samples have been inserted into the sample space 55, the fluid chamber 51 is vented and the sample space reinserted into the oven block 45. In order to insure the rapid recovery of the temperature of the portion of the piston 50 which is withdrawn from the oven block 45 for sample insertion, the heat capacity of the portion withdrawn must be small relative to the heat capacity of the oven block 45. When the heat capacity of the sample insertion portion of the apparatus is no greater than one tenth of the heat capacity of the oven block 45, the thermal recovery time will be short enough for the rapid testing contemplated and the temperature of the oven block will not vary by more than ±5 centigrade degrees during the sample insertion and warm-up period. After sample warm-up the oven should be controlled to vary by no more than one half of the test condition temperature interval.

The sample space 55 is provided with a baffle plate 56 supported by a post 57 in the withdrawn position, as shown a protective lid 58 rests on the baffle plate 56. When the samples are withdrawn into the oven block 45, the protective lid 58 comes to rest on the upper edge 59 of the oven block 45 so that the protective lid 58 is no longer in contact with the baffle plate 56.

When the sample space 55 is withdrawn into the oven block 45 the desired testing atmosphere is introduced into orifice 60. With the piston in the down position, this orifice is brought into registry with a circular groove 61 provided in the wall of piston 50. Between the groove 61 and the upper end of the piston 50 the piston wall is provided with a set of spiral grooves 62 which serve to guide the gas to the sample space 55. These grooves also serve as a heat exchanger to bring the temperature of the gas up to the temperature of the oven block 45 before it reaches the sample space 55. The gas is introduced into the sample space 55 from the outer edge of the piston 50 and is forced to flow across the samples and up through the center hole 63 in the baffle plate 56. Gas is introduced into orifice 60 at a rate such as to provide a linear velocity of gas flow passed the samples of from 1 millimeter per second to 10 centimeters per second. If the velocity is less than 1 millimeter per second it may be difficult to provide sufficient thermal contact between the sample and the oven to reliably maintain the sample temperature close to the oven temperature during the period of slow exothermal reaction. If the gas velocity is greater than 10 centimeters per second heat generated in the sample during the period of rapid exothermal reaction may be carried away too rapidly and the sample temperature may not rise sufficiently to satisfy the test condition.

EXAMPLES

An apparatus was constructed in accordance with the above-described principles. The oven structure was as depicted in FIG. 4 and mainly constructed of chrome plated brass. The thermal sensors were platinum resistance thermometers, each encased in a thin stainless steel shell. The thermometers were mounted so as to be in good thermal contact with the upper end of the shell. During testing, oxygen was passed through the oven at a rate of between 100 and 200 cubic centimeters per minute. This flow rate corresponds to a linear velocity between 2 mm/sec and 4 mm/sec past the samples. The samples were placed in pans approximately one centimeter in diameter and each pan was placed directly on top of a thermometer shell. During repeated operation for the screening of large numbers of samples, the time required to clear tested samples and load new samples was approximately 1 minute. After sample insertion, the oven returned to operating temperature (to within one-half of the test condition temperature interval) in less than 2 minutes. The temperature of the oven was regulated to ±0.05 centigrade degrees.

EXAMPLE I

1. Sample Description: Polyethylene (0.92 density, 0.3 melt index) allegedly containing 0.1 percent by weight tetrakis[methylene 3-(3',5'-di-t-butyl-4'-hydroxyphenyl) propionate]methane; approximately one-half gram of sheet material.
2. Test Temperature: 200°C
3. Preset Test Condition: 0.1 centigrade degrees
4. Average Screening Time: 30.1 minutes

EXAMPLE II

1. Sample Description: Polyethylene (0.92 density, 0.3 melt index) allegedly containing 0.1 percent by weight tetrakis[methylene 3-(3',5'-di-t-butyl-4'-hydroxyphenyl) propionate]methane and 0.1 percent by weight N,N'-dibenzal(oxalyl dehydrazide); approximately one-half gram of insulated copper wire, 40 percent by weight of polyethylene.
2. Test Temperature: 200°C
3. Preset Test Condition: 0.1 centigrade degrees
4. Average Screening Time: 10.4 minutes

EXAMPLE III

1. Sample Description: Polyethylene (0.92 density, 0.3 melt index) allegedly containing 0.1 percent by weight tetrakis[methylene 3-(3',5'-di-t-butyl-4'-hydroxyphenyl) propionate]methane and 0.1 percent by weight N,N'-dibenzal(oxalyl dehydrazide), approximately one-half gram of insulated copper wire 40 percent by weight of polyethylene. (This wire was obtained from a different manufacturer from that of Example II.)
2. Test Temperature: 200°C
3. Preset Test Condition: 0.1 centigrade degrees
4. Average Screening Time: 24.0 minutes

EXAMPLE IV

1. Sample Description: Polypropylene containing a proprietary antioxidant.
2. Test Temperature: 200°C
3. Preset Test Condition: 0.1 centigrade degrees
4. Average Screening Time: 6.1 minutes

EXAMPLE V

1. Sample Description: Polyethylene (0.94 density, 0.3 melt index) containing same additive combination as in Example II and with the same sample physical description.
2. Test Temperature: 200°C
3. Preset Test Condition: 0.1 centigrade degrees
4.

TABLE

| Sample No. | Screening Time |
|---|---|
| 1 | 9.9 minutes |
| 2 | 11.2 |
| 3 | 11.8 |
| 4 | 7.6 |
| 5 | 11.8 |

If the minimum acceptable screening time in Example V were 10 minutes, Samples 1 and 4 would be unacceptable. Samples 2, 3 and 5 would be acceptable. In a production screening situation, testing could have been terminated after the elapse of the minimum acceptable screening time.

What is claimed is:

1. Apparatus for the testing of polymeric materials containing at least one additive for protection against exothermal degradation, comprising an oven, which oven contains thermal sensors each of which can produce an electrical output signal, and signal processing means for accepting at least one of the electrical output signals and producing at least time interval information characterized in that
   a. the thermal sensors include at least one reference sensor and a plurality of sample sensors;
   b. the oven includes sample insertion means for inserting a plurality of samples of at least one polymeric material into the oven, the thermal mass of which insertion means is at most 10 percent of the thermal mass of the oven, each inserted sample being brought into thermal contact with one sample sensor;
   c. the signal processing means includes means for comparing the output of each sample sensor with the output of one reference sensor and producing a difference signal;
   d. the signal processing means includes means for indicating the time, relative to an initial time, at which the difference signal derived from each sample sensor, meets a preset condition.

2. Apparatus of claim 1 in which the oven includes gas insertion means for introducing a gaseous atmosphere of a desired composition into the region of the oven provided for receiving the samples.

3. Apparatus of claim 2 in which the gas insertion means includes a heat exchanger for raising the temperature of the gas to the operating temperature of the oven before the gas reaches the region of the oven provided for receiving the samples.

4. Apparatus of claim 1 including means for maintaining the oven at a temperature which is constant to within ±5 centigrade degrees during the operating time of the apparatus which includes more than one operation of the sample insertion means.

5. Apparatus of claim 1 in which the thermal sensors are resistance therenometers.

6. Apparatus of claim 5 in which the signal processing means possesses sufficient sensitivity to permit the preset condition to correspond to a rise in the temperature of a sample sensor relative to the temperature of the reference sensor by from 0.01 centigrade degree to 1 centigrade degree.

7. Apparatus of claim 6 in which the signal processing means includes an elapsed time indicator corresponding to each sample sensor, which elapsed time indicator is arranged to start running upon operation of the sample insertion means and to stop running when the preset condition is satisfied.

8. Apparatus of claim 7 including at least four sample sensors.

9. Apparatus of claim 8 in which the sample insertion means includes a hydraulically actuated piston.

10. A method for the testing of polymeric materials containing at least one additive for protection against exothermal degradation, comprising:
   a. maintaining a plurality of polymer samples at an essentially constant measurement temperature in an oxidizing atmosphere for a time period starting at a first time;
   b. maintaining each portion in thermal contact with one of a plurality of sample thermometer elements;
   c. comparing each sample thermometer element with a reference therenometer element;
   d. measuring a time interval for each sample between the first time and a second sample time determined by the rise of the temperature of each sample thermometer element, by a predetermined temperature difference, above the temperature of the reference thermometer element; and
   e. comparing the time interval with a predetermined time interval whereby the degree of protection against exothermal degradation is indicated.

11. A method of claim 10 including contacting the samples with a gas stream of linear velocity from 1 millimeter per second to 10 centimeters per second.

* * * * *